A. H. & C. H. KIMBALL.

ROAD SCRAPER AND GRADER.

No. 10,088. Reissued Apr. 18, 1882.

Attest:

S. B. Hildreth.

E. A. Hildreth.

Inventor:

A. H. Kimball.

C. H. Kimball

N. PETERS, Photo-Lithographer, Washington, D. C.

UNITED STATES PATENT OFFICE.

ALONZO H. KIMBALL AND CHARLES H. KIMBALL, OF LITTLETON, MASS.

ROAD SCRAPER AND GRADER.

SPECIFICATION forming part of Reissued Letters Patent No. 10,088, dated April 18, 1882.

Original No. 231,589, dated August 24, 1880. Application for reissue filed June 2, 1881.

*To all whom it may concern:*

Be it known that we, ALONZO HAYWARD KIMBALL and CHARLES HERBERT KIMBALL, of Littleton, in the county of Middlesex and State of Massachusetts, have invented a new and useful Improvement in Road Scrapers and Graders, of which the following is a specification.

Figure 1:
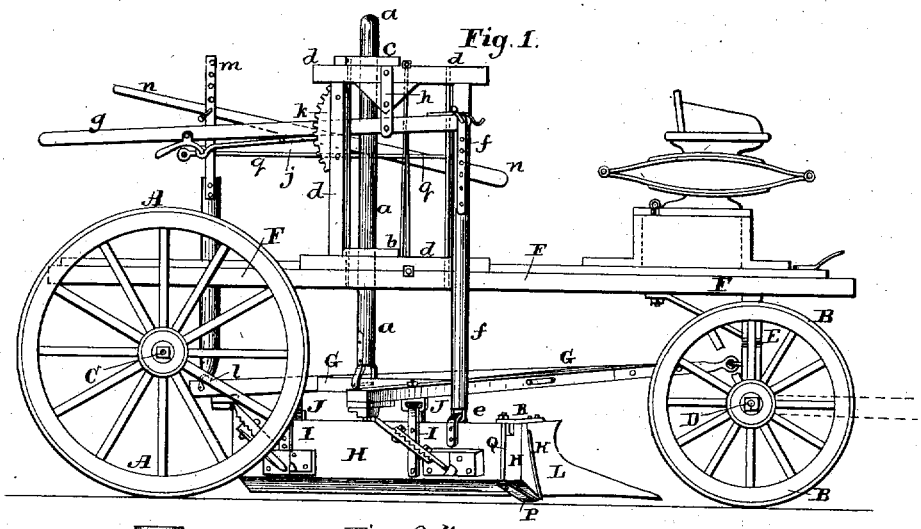
Figure 2:
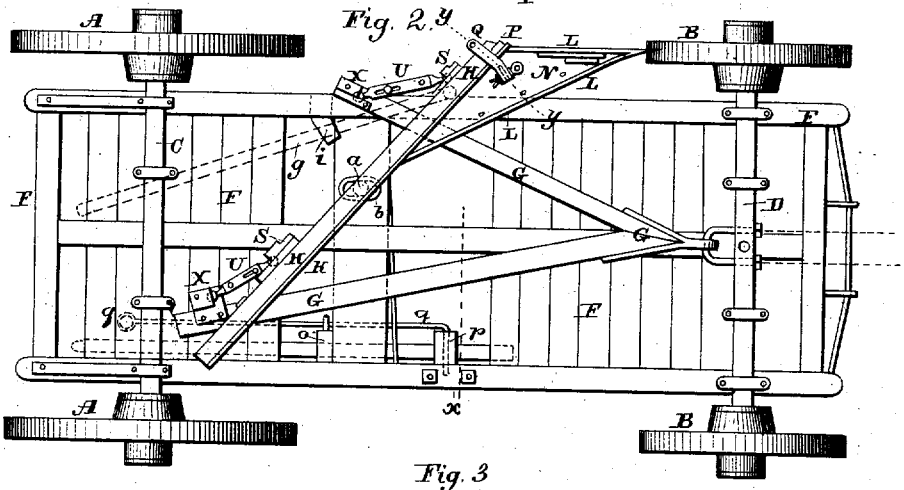
Figure 3:
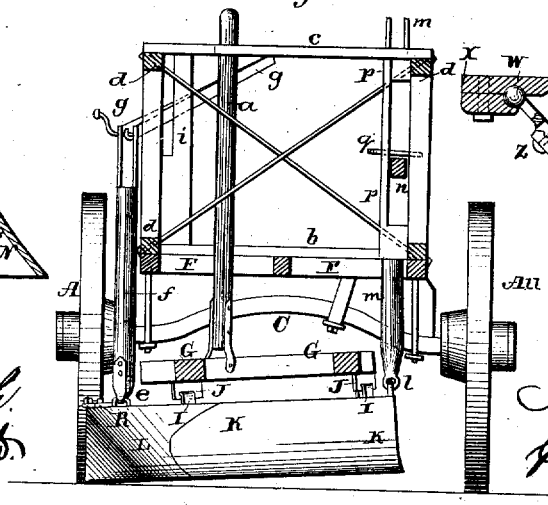
Figure 4:
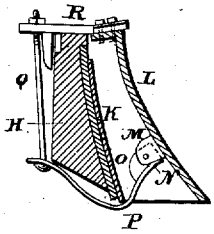
Figure 5:
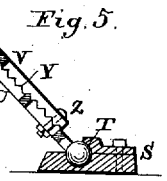

Figure 1 is a side elevation of the improvement. Fig. 2 is a bottom view. Fig. 3 is a sectional end elevation taken through the line *x x*, Fig. 2. Fig. 4 is a sectional elevation taken through the line *y y*, Fig. 2. Fig. 5 is a side elevation of one of the adjustable braces. Similar letters of reference indicate corresponding parts.

The object of this invention is to furnish road scrapers and graders so constructed that they may be readily adjusted to cut the ground to any desired depth, to give any required crown to the road, to move the soil without becoming clogged, and which will be held firmly against side movement.

The invention consists in the combination, with the scraper, of appliances for connecting the scraper with a wagon, and also for holding, adjusting, gaging, and controlling the scraper, as will be hereinafter fully described.

A represents the rear wheels, B the forward wheels, C the rear axle, D the forward axle, E the forward bolster, and F the platform, of a wagon, which may be an ordinary wagon or a wagon built expressly for the machine. To the center of the forward axle, D, is pivoted the forward end or angle of a triangular frame, G.

H is the plank or stock of the scraper, which is hinged at its upper edge, and in an inclined position, to the rear angles of the frame G by straps I and eyebolts J, or other suitable means. To the forward side of the plank H is bolted or otherwise secured the steel plate K. To the forward side of the forward end of the scraper H K is secured the plow L, which is made with a vertical landside, a tapering point, and a concaved mold-board, the outer end of the mold-board being so formed as to fit snugly against the forward side of the steel plate K. Upon the rear side of the lower part of the mold-board of the plow L is formed, or to it is attached, a lug, M, which is secured by a split pin, N, to a lug, O, formed upon the forward end of a short bar, P. The bar P crosses and rests against the lower edge of the scraper H K, and has a hole in its rear end to receive the bolt Q, which passes up at the rear side of the scraper H K, through a hole in the rear end of the bar R, and has a nut screwed upon its upper end. The bar R crosses and rests upon the upper edge of the scraper H K, has a lug formed upon its lower side to rest against the plank H, and its forward end is bolted or otherwise secured to the top of the plow L. With this construction the plow L can be conveniently attached when required for use, and detached when not required for use.

To the lower part of the rear side of the plank H, near its ends, are attached socket-blocks S, in which work the balls T, formed upon the lower ends of the lower parts, U, of the braces U V. The upper parts, V, of the braces U V have balls W formed upon their upper ends, which balls W work in socket-blocks X, attached to the rearwardly-projecting ends of the side bars of the triangular frame G. The parts U V of the braces overlap each other, have teeth or corrugations Y formed upon their adjacent sides, and are slotted longitudinally to receive the bolts Z, by which they are locked together. The braces U V support the lower part of the scraper against the draft-strain, and may be adjusted in length to give more or less pitch to the scraper H K, as may be required. By this construction the ball-and-socket joints S T and X W give a firm and square bearing to the braces U V, however they may be adjusted.

To the rear bar of the frame G is attached the lower end of a standard, *a*, which passes up through holes in the cross-bars *b c* of the frame *d*, which is bolted to the frame or platform F. With this construction the scraper is held firmly in place, so that it cannot run into the gutter or to the side of the machine, but must move forward upon the line of draft.

The holes through the cross-bars *b c* of the frame *d* may be faced with metal to prevent wear. To the forward part of the upper edge of the stock or plank H is hinged by U-straps or clevises *e* the lower end of a bar, *f*, the upper end of which is slotted or has straps attached to the opposite sides of its upper end to receive the forward end of the lever *g*. Several holes are formed in the slotted upper end of the bar *f*, to receive the pivoting pin, bolt, or screw by which the lever *g* is pivoted to the said bar *f*, so that the said lever *g* can be adjusted as required. The lever *g* is pivoted to a support, *h*, attached to the frame *d*. The rear end of the lever *g* projects over the rear part of the platform F, so that it can be readily operated by an attendant standing upon the said rear part of the platform F, to raise and lower the forward end of the scraper, as may be required. The lever *g* passes through a guide-slot in a bar or keeper, *i*, attached to a post of the frame *d*. The lever *g* is provided with a lever spring-pawl, *j*, to engage with the teeth of a toothed bar or segment, *k*, attached to the frame *d*, to hold the scraper securely in any position into which it has been adjusted.

To the rear part of the upper edge of the stock or plank H is hinged by U-straps or clevises *l* the lower end of a bar, *m*, the upper end of which is slotted or has straps attached to its opposite sides to receive the lever *n*. Several holes are formed in the upper slotted end of the bar *m*, to receive the pivoting pin, screw, or bolt, so that the said pivot may be adjusted as required. The lever *n* is pivoted to a support, *o*, attached to the frame *d*, and the forward end of the said lever passes through a guide-slot in a bar or keeper, *p*, attached to the forward post of the frame *d*. With this construction the rear end of the scraper can be raised and lowered by operating the lever *n* to give any desired elevation to the crown of the road.

The forward end of the lever *n* is held from rising and allowing the rear end of the scraper to drop below the desired point by the end of the rod *q*, which passes through one or another of the holes in the keeper *p* and the post of the frame *d*, above the said lever *n*.

The rod *q* is bent to the rearward, so that it can be readily operated by the attendant standing upon the rear part of the platform F.

When it is only necessary to remove ridges and fill ruts in the road-bed the plow L may be detached, the said plow L being only required when soil is to be taken from the side of the road and deposited upon the road-bed.

When the machine is in operation the lever *g* is securely held in position by means of the catch *j* and segment *k*. The standard *f* holds the outer end of the scraper H K at a uniform depth in the ground, carrying the scraper positively through the ground, and compelling the scraper to cut the road-bed to a uniform depth at the outer or cutting end of the scraper.

The inner end of the scraper is supported or held down, as desired, by means of the standard *m* and lever *n*, which lever *n* is in turn held in position by the rod-pin *q*, which can be placed beneath or above the forward end of the lever *n*.

The road-bed can be formed more or less crowning, according to the adjustment of the levers *g* and *n*.

The axles, wheels, and wagon-body are connected to the scraper in such a manner that the scraper cannot be forced to either side without also forcing the wheels and wagon-body out of their natural course. This gives a firm and steady motion to the scraper while in operation, and the road-bed will be scraped and formed into the desired shape in a much more perfect manner than it would be possible to do if the scraper were not held rigidly to its work in all directions.

The construction of our machine, by means of which we are enabled to carry the forward or cutting end of the scraper at a uniform depth, compelling it to cut through the hardest and toughest soils, is a very decided advantage over all those machines in which the scraper is left free to rise whenever it comes into contact with hard uneven bunches. The construction of our improved scraper is such that the scraper can be adjusted to cut to any desired depth, and at any depth at which it is set can be held rigidly down to its work and compelled to cut through stony, tough, and obstinate soils by the whole weight of the wagon to which it is attached.

When from the nature of the soil rocks or bowlders make it impossible to cut an even slice, the operator can at any time, if desired, release the scraper by withdrawing the catch *j* from the segment *k* and by placing the rod-pin *q* over the forward end of the lever *n*. In this position the scraper can be allowed to follow their regularities of the road-bed, if desired. In our improved machine we so attach the scraper to the auxiliary frame and to the wagon-body that the forward or cutting end of the scraper shall come between and in a line with the tread of both forward and rear wheels upon the off side of the wagon. By this arrangement the wheels on the off side of the wagon will in a very perfect manner determine the depth of the cut of the plow and scraper. Both off wheels can be run upon the side of the road just where it is desired to form the gutter, and the plow will turn up the earth and the scraper will remove the same from the gutter into the bed of the roadway. When the cutting end of the scraper comes in a line with and between the tread of the wheels, as our improved machine is constructed, both wheels upon one side of the scraper can be run exactly in the line of the gutter, the plow set at the desired depth, and the other end of the scraper raised to a considerable height, and in this position the machine can be used successfully to clear out the old or to construct new gutters upon the sides of the road-bed.

We do not desire to claim a road-scraper in which the scraper is simply raised or suspended by flexible ropes, cords, or chains, as was done in the case of G. W. Sayre, No. 37,829, patented March 3, 1863, and also in the case of R. F. Read, No. 144,925, patented November 25, 1873; but What we do claim as new, and desire to secure by Letters Patent, is—

1. The combination, in a road scraper or grader, of a wagon-body mounted upon two axles and four carrying-wheels, a scraper set upon an angle to move the gravel sidewise toward the center of the road-bed, a removable plow attached to the forward or cutting end of the scraper, standards extending upward and connected with levers to control or adjust each end of the scraper, and a locking device or devices by means of which the scraper and plow can be set at various depths of cut and held securely at the required depth, utilizing the weight of the wagon to hold the scraper to its work, substantially as described, and for the purpose specified.

2. The combination, in a road scraper and grader, of the wagon-body mounted upon four wheels, an auxiliary frame-work so connected with the main frame that it will be held rigidly against side motion in relation thereto, but left free to vertical adjustment, a scraper secured to the auxiliary frame in such a manner that the face of the scraper can be set at various inclinations with the plane of the ground, a connecting standard or standards, and a lock or fastening device, substantially as described, by means of which the scraper can be locked to cut to any required depth.

3. The combination, in a road scraper and grading machine, of the wagon-body F, mounted upon four carrying-wheels, the scraper H K, connected to the wagon by a carrying-frame, G, the controlling-standard *f*, attached to the forward or cutting end of the scraper, and the adjusting-lever *g* and locking device connected therewith, by means of which the cutting end of the scraper can be adjusted to cut at various depths and held to a uniform depth of cut by the weight of the wagon, substantially as described.

4. The combination, in a road scraper and grading machine, of the main wagon-body, mounted upon four wheels, the auxiliary frame G, connected with the main wagon-body in such a manner that it carries the scraper and holds it against the side draft, the standards *f* and *m*, for adjusting the cut of the scraper, the levers *g* and *n*, for raising and lowering the scraper, the segment *k* and catch *j*, for locking the cutting end of the scraper to the required depth of cut, and the pin *q*, used to hold the lever *n* and the rear end of the scraper at the required height or depth, substantially as described, and for the purpose set forth.

5. The combination, with the scraper H K, of the removable plow L, by means of the bar P, passing beneath the scraper-blade, the bar R, passing over the scraper, both connected with lugs or projections on the rear surface of the plow, and bolt Q, all combined and operating substantially as described, and for the purpose specified.

6. In a road scraper and grader, the combination, with the scraper H K and the frame G, of the extension-braces U V, provided with ball-and-socket bearings W X and T S at their ends, substantially as herein shown and described, to give the braces a firm support at whatever pitch the scraper may be adjusted, as set forth.

ALONZO HAYWARD KIMBALL.
CHARLES HERBERT KIMBALL.

Witnesses:
EDWIN A. HILDRETH,
STANLEY B. HILDRETH.